US010897398B2

(12) United States Patent
Al-Yousef et al.

(10) Patent No.: US 10,897,398 B2
(45) Date of Patent: Jan. 19, 2021

(54) EMBEDDED DYNAMIC CONFIGURATION ASSIGNMENT FOR UNPROTECTED REMOTE TERMINAL UNIT (RTU)

(71) Applicant: Saudi Arabian Oil Company, Dhahran (SA)

(72) Inventors: Hassan S. Al-Yousef, Qatif (SA); Fouad M. Alkhabbaz, Qatif (SA); Zakarya A. Abu Al Saud, Saihat (SA); Soloman M. Almadi, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 96 days.

(21) Appl. No.: 16/266,382

(22) Filed: Feb. 4, 2019

(65) Prior Publication Data

US 2020/0252288 A1 Aug. 6, 2020

(51) Int. Cl.

*G06F 11/00* (2006.01)
*H04L 12/24* (2006.01)
(Continued)

(52) U.S. Cl.

CPC ...... *H04L 41/0886* (2013.01); *H04L 41/0813* (2013.01); *H04L 63/0876* (2013.01);
(Continued)

(58) Field of Classification Search

CPC ... H04L 41/0886; H04L 63/20; H04L 63/101; H04L 41/0813; H04L 63/0876;
(Continued)

(56) References Cited

U.S. PATENT DOCUMENTS 6,163,257 A 12/2000 Tracy
7,644,290 B2 1/2010 Ransom et al.
(Continued)

FOREIGN PATENT DOCUMENTS

WO 2018207123 11/2018

OTHER PUBLICATIONS

International Search Report and Written Opinion issued in International Application No. PCT/US2020/019009 dated May 8, 2020, 14 pages.

(Continued)

*Primary Examiner* — Chuong T Ho
(74) *Attorney, Agent, or Firm* — Fish & Richardson P.C.

(57) ABSTRACT

Systems and methods include a method for configuring, without intervention by a Control System Engineer, a remote terminal unit (RTU) in a “raw” condition from a centralized system in a supervisory control and data acquisition system (SCADA) network augmented by authentication controls from existing Network Access Control or site occupancy sensors. An RTU configuration request is received to configure an RTU in a remote location and pre-configured with an embedded remote configuration assignment capability. A low-level communication channel with the RTU is established through an initial data communication relay apparatus for using a low-level communication protocol. A SCADA Communication Protocol address for the RTU to support a high-level communication channel is assigned. The RTU is connected to the SCADA network and configured for use in the SCADA network. Configuration is done using high-level communication after authenticating the identity of the RTU and the integrity of the configuration request.

17 Claims, 4 Drawing Sheets

200
REQUEST FOR CONFIGURATION 202
210 RTU
212 IDDR
SCADA NETWORK 214
216
218 DRCAS REQUEST STRUCTURE 228
REQUEST TYPE
SOURCE ADDRESS (RTU ADDRESS) 220
DESTINATION ADDRESS (BROADCAST) 222
AUTHENTICATION VALUE 226
DATA
224
NETWORK LAYER 206
NETWORK DRIVER INTERFACE SPECIFICATION 230
NDIS
242 244 246
RESPONSE FOR CONFIGURATION 204
(AIX, HP-UX, SOLARIS)
LINUX, VMS, WINDOWS)
234 DYNAMIC RTU CONFIGURATION ASSIGNMENT SERVER
OPERATING SYSTEM
232 DRCAS OPERATING SYSTEM
ActiveX DATA OBJECTS (ADO)
OLE DATABASE
ODBC 236
OPEN DATABASE CONNECTIVITY INTERFACE
SCRA 238
SCADA RTU CONFIFURATION ARRAY

| CONFIGURATION REQUEST SEQUENCE | RTU PHYSICAL ADDRESS | CONFIGURATION FILE |
|---|---|---|
| DRCS1 | 000.000.000 | RTU_CXA |
| DRCS2 | 000.000.001 | RTU_WYG |
| DRCS3 | 010.000.001 | RTU_BVH |
| DRCS4 | 110.010.110 | RTU_VCG |
| DRCS5 | 000.111.110 | RTU_KKL |

240 DYNAMIC RTU CONFIGURATION SERVER DATABASE
SYSTEM LAYER 208

(51) Int. Cl.
*H04L 29/06* (2006.01)
*H04W 8/22* (2009.01)
*H04W 80/02* (2009.01)
*H04W 80/08* (2009.01)
*H04W 88/08* (2009.01)

(52) U.S. Cl.
CPC ............ *H04L 63/101* (2013.01); *H04L 63/20* (2013.01); *H04W 8/22* (2013.01); *H04W 80/02* (2013.01); *H04W 80/08* (2013.01); *H04W 88/085* (2013.01)

(58) Field of Classification Search
CPC ... H04W 80/08; H04W 80/02; H04W 88/085; H04W 8/22
USPC .................................................. 370/252, 254
See application file for complete search history.

(56) References Cited

U.S. PATENT DOCUMENTS 7,739,359 B1 6/2010 Millet et al.
7,940,302 B2 5/2011 Mehrotra et al.
8,102,238 B2 1/2012 Golander et al.
8,312,320 B2 11/2012 Almadi
8,334,775 B2 12/2012 Tapp et al.
8,365,250 B2 1/2013 Denny
8,543,716 B1 9/2013 Rashidi
8,750,513 B2 6/2014 Renkis
9,208,676 B2 12/2015 Fadell et al.
2004/0188710 A1 9/2004 Koren et al.
2005/0184084 A1 8/2005 Wells
2006/0107061 A1 5/2006 Holovacs
2007/0126576 A1 6/2007 Script et al.
2007/0193834 A1 8/2007 Pai
2008/0109883 A1 5/2008 Hernoud et al.
2008/0109889 A1* 5/2008 Bartels .................... H04L 63/10 726/7
2008/0228908 A1 9/2008 Link
2009/0141896 A1 6/2009 McCown
2010/0097205 A1 4/2010 Script
2012/0060030 A1 3/2012 Lamb
2012/0063354 A1* 3/2012 Vanga ................. H04L 41/0816 370/254
2012/0162423 A1 6/2012 Xiao
2012/0307051 A1 12/2012 Welter
2013/0232338 A1* 9/2013 Byres ...................... H04L 67/34 713/162
2013/0247117 A1 9/2013 Yamada
2014/0019768 A1 1/2014 Pineau et al.
2014/0089671 A1 3/2014 Logue
2014/0139681 A1 5/2014 Jones, Jr. et al.
2014/0165182 A1* 6/2014 Curry .................. H04L 63/0209 726/12
2014/0230057 A1 8/2014 Berger
2014/0254799 A1 9/2014 Husted
2014/0280953 A1 9/2014 Brzozowski et al.
2016/0006745 A1 1/2016 Furuichi
2016/0379211 A1 12/2016 Hoyos
2017/0353491 A1 12/2017 Gukal
2017/0356780 A1* 12/2017 Smith ................... G01F 15/068
2018/0092331 A1 4/2018 Zuidhof

OTHER PUBLICATIONS

PCT International Search Report and Written Opinion issued in International Application No. PCT/US2020/015917 dated May 13, 2020, 14 pages.

International Search Report and Written Opinion issued in International Application No. PCT/US2018/028055 dated Jun. 27, 2018, 14 pages.

* cited by examiner

| CONFIGURATION REQUEST SEQUENCE | RTU PHYSICAL ADDRESS | CONFIGURATION FILE |
|---|---|---|
| DRCS1 | 000.000.000 | RTU_CXA |
| DRCS2 | 000.000.001 | RTU_WYG |
| DRCS3 | 010.000.001 | RTU_BVH |
| DRCS4 | 110.010.110 | RTU_VCG |
| DRCS5 | 000.111.110 | RTU_KKL |

EMBEDDED DYNAMIC CONFIGURATION ASSIGNMENT FOR UNPROTECTED REMOTE TERMINAL UNIT (RTU)

BACKGROUND

The present disclosure relates to automatically configuring remote terminal units (RTUs or programmable logic controllers (PLCs)) that are in a "raw" condition, such as in a supervisory control and data acquisition system (SCADA) network. Configuration can be completed using a centralized system on the SCADA network that is augmented by authentication controls from existing Network Access Control (NAC) or site occupancy sensors (for example, radio frequency identification (RFID) and motion sensors) or both. A SCADA network can include automation software written specifically to perform data acquisition requirements for an individual plant. The software can control commands and data transfer between master stations (including servers and software responsible for communicating with field equipment), human machine interface (HMI) workstations, and field devices connected to remote terminal units (RTUs). Field devices can include, for example, pressure transmitters, flow meters, and temperature sensors. SCADA networks that include geographically dispersed RTUs can present challenges regarding the ability to apply "initial" on-site configuration without the presence of a Control System Engineer (CSE), configuration tools, and associated laboratory hardware and software.

SUMMARY

The present disclosure relates to providing automatic configuration assignment capabilities for remote terminal units (RTUs) (or programmable logic controllers (PLCs)), such as in a supervisory control and data acquisition system (SCADA) network without the direct intervention of a Control System Engineer (CSE). The automatic configuration pertains to the capability of configuring a raw RTU "from scratch" by: 1) facilitating an "initial" node configuration (including assigning the RTU preliminary communication address parameters) using a low-level communication method and apparatus; 2) by receiving augmented authentication controls from existing Network Access Control (NAC) or site occupancy sensors (for example, radio frequency identification (RFID) and motion sensors) or both; and 3) by uploading the full configuration of the field device (RTU or PLC), facilitating a high-level communication method and apparatus.

Typically, before an RTU (or PLC) is deployed into the field, it is normally brought in from the warehouse into the plant's Central Control Room (CCR) configuration lab where the CSE manually assigns the initial configuration parameters for the RTU including, for example, an RTU name, Internet protocol (IP) address. Next, the RTU is further configured with field instrument port and address assignments. Once fully configured, the RTU is then transported to the designated installation site where field instrumentation engineers can install, verify, and cable termination panels, connect the RTU to field devices, and power the RTU on for initial SCADA data acquisition testing.

In some occasions, the newly-installed RTU does not function properly within the pre-specified parameters as set forth by the engineering design document. This can be attributed to faults in instrumentation, for example, connectors, field devices such as sensors, transmitters, cable termination, or an RTU power supply. In such events, the field instrumentation engineers can apply the required fixes to bring the RTU back into normal operations. This can be done by inspecting the field wiring for errors, replacing a faulty instrument, or adjusting the power supply levels to the RTU.

In other occasions, however, the newly-installed RTU does not properly function within the pre-specified parameters as set forth by the SCADA engineering design document due a misconfiguration error that can only be fixed by applying a new, modified configuration file. Unless the process control engineer is on-site with the right equipment (including, for example, a laptop computer, configuration software, and configuration hardware including cables and connectors), the RTU will most likely be required to be brought back to the main facility's Central Control Room (CCR) for a re-configuration. Considering a mass SCADA deployment project involving the installation of tens of RTUs in geographically-spread locations (for example, in desert or deep sea locations), such prospect can be very time- and effort-consuming, causing project deployment delays and eventual production loss.

The present disclosure describes techniques that can be used to provide embedded dynamic configuration assignment capabilities for unprotected remote terminal unit (RTUs) that can be used to fully and securely configure a "raw" RTU remotely from the main facility without having to transport the CSE to the RTU location. The techniques can be included as part of a system and a method for SCADA network access from a remote RTU in a physically unprotected location. Further, the techniques can be defined by configuration data that is augmented with associated personnel identification and authentication information, for example, as part of SCADA networks. For example, the SCADA networks can support upstream oil and gas applications, pipeline applications, and power and utility applications, specifically in installations that are unprotected by adequate physical security controls.

In some implementations, a computer-implemented method, includes a method for remotely configuring a RTU. An RTU configuration request is received by a dynamic RTU configuration assignment server (DRCAS) in a SCADA network. The RTU configuration request is a request to configure an RTU residing in a location remote from the DRCAS. The RTU is pre-configured with an embedded remote configuration assignment capability. As part of this method, an initial low-level communication channel with the RTU will need to be established by the DRCAS through an Initial Data Communication Relay (IDCR) apparatus that either can be fitted as part of the RTU or as a standalone device downstream of the RTU. The low-level communication channel uses a low-level communication protocol to convey initial configuration parameters such as the RTU request to obtain a configuration, RTU name and RTU Medium Access Control Address (MAC). A SCADA Communication Protocol (SCP) address for the RTU is then assigned by the DRCAS through the IDCR after receiving augmented authentication controls from existing Network Access Control (NAC) or site occupancy sensors (for example, radio frequency identification (RFID) and motion sensors) or both to ensure authenticity of the RTU and validity of the configuration request. Once authenticated, the DRCAS will assign a high-level communication channel address with the RTU followed by a full configuration upload to the RTU memory bank.

In some implementations, a computer-implemented method includes a method for remotely configuring a RTU. An RTU configuration is uploaded from DRCAS through the low-level communication IDR apparatus and the DRCAS supported high-level communication channel with peer-to-peer hash function security authentication and integrity check. As part of this method, the DRCAS and the "raw" RTU are pre-programmed to apply a hash function with multi-input parameters such as an RTU MAC address, the first three digits of the RTU name, the site appreciation index, and the badge number of the CSE. The hash function methodology can be enabled in the absence of NAC apparatus and field security control such as radio frequency identification (RFID) and motion sensors or a combination of both.

The previously described implementation is implementable using a computer-implemented method; a non-transitory, computer-readable medium storing computer-readable instructions to perform the computer-implemented method; and a computer-implemented system that includes a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, the techniques can simplify and speed deployment of grass root the mode RTUs in a SCADA network, especially in physically unprotected locations that are distributed geographically. Second, the techniques can provide a mechanism to re-test (or evaluate on spot) several working models for the RTU in remote site without having to bring the RTU in from the field. Third, the techniques can be used to build an instant laboratory snapshot (for example, a temporary staging as part of Factory Acceptance Test (FAT)/Site Acceptance Test (SAT) testing procedures) of the entire SCADA The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
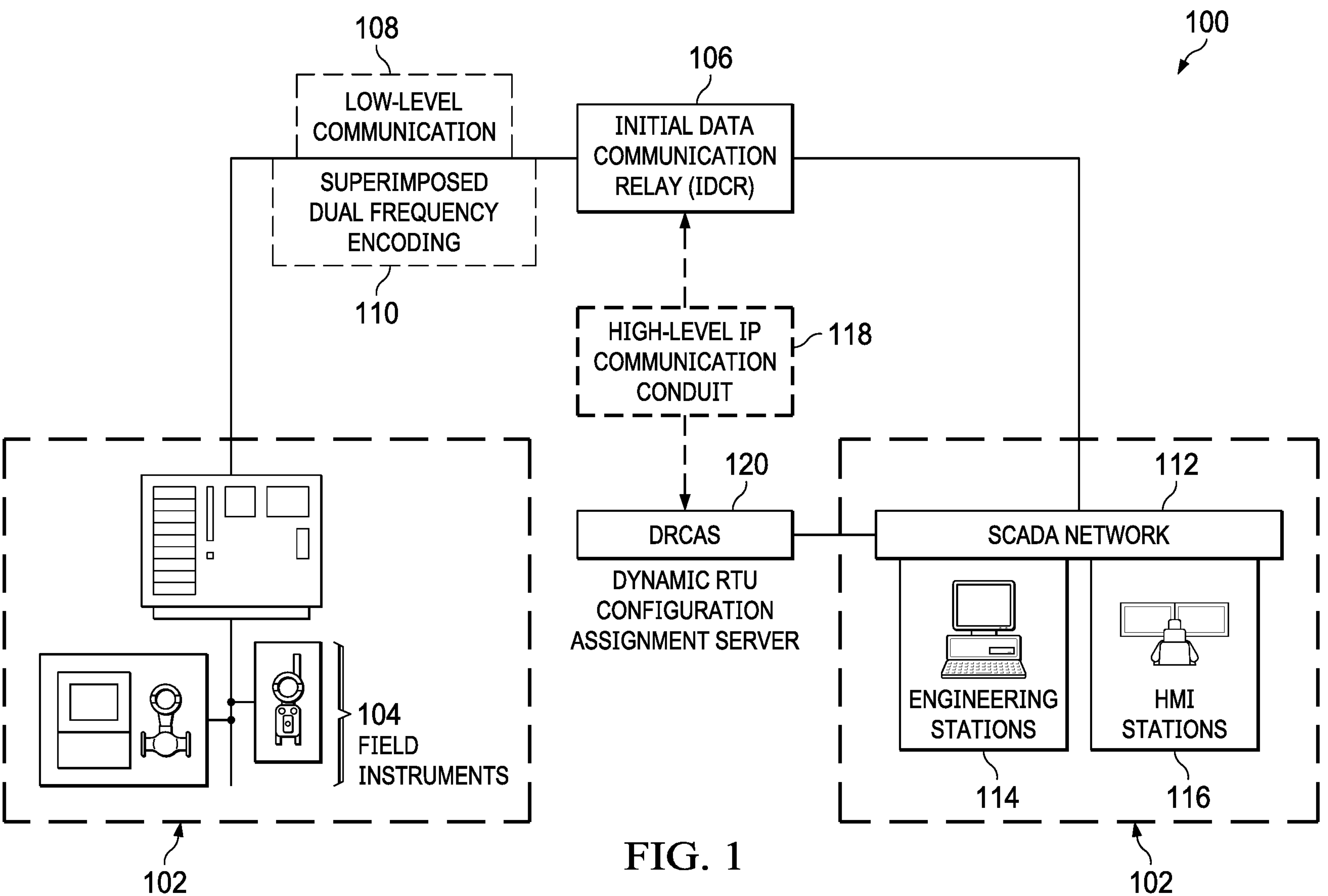
FIG. 1 is a block diagram depicting an example of a communication architecture including a dynamic remote terminal unit (RTU) configuration assignment server (DRCAS), according to some implementations of the present disclosure.

The following detailed description describes techniques for providing embedded dynamic configuration assignment capabilities for "raw" and unprotected remote terminal unit (RTUs) from a centralized system on the SCADA network that is augmented by authentication controls from existing Network Access Control (NAC) or site occupancy sensors (for example, radio frequency identification (RFID) and motion sensors) or both. The RTUs can be part of a supervisory control and data acquisition system (SCADA) network, for example. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

SCADA systems can include automation software that is written specifically to perform data acquisition requirements for individual plants. At a given plant, the software can control commands and data transfer between master stations (including servers and software for communicating with field equipment), human machine interface (HMI) workstations in control rooms, and field devices connected to RTUs including, for example, pressure transmitters, flow meters, and temperature sensors.

Distributed Control Systems (DCSs) are designed to perform regulatory control algorithms and processes to keep processes within set-points in a specific area (or risk area) of the plant. A DCS can provide supervisory control, including performing event-based monitoring algorithms that perform data-gathering over a large geographical area. Unlike DCSs, SCADAs can provide telemetry-based process control commands initiated from a master central station ("master station"). Commands can be provided either manually by an operator or automatically using an application. Each command can initiate an action or change an analog set point in a remotely-located control station, for example, using a remote terminal unit (RTU). Commands can be provided over a bidirectional communications link using specific communication protocols. Commands can depend on quality process-related alarm data or event data and can follow timely bidirectional confirmation and acknowledgment executing sequences (for example, check before operate (CBO)) procedures between a master station and remote terminals.

Each master station can include multiple servers, distributed software applications, and disaster recovery sites. Master stations can include network switch and connectivity devices that are required to communicate with RTUs and remote sites. Communications can use bidirectional information transfer between master stations and remote terminals within a communication channel. As part of SCADA operations, commands can be sent by operators or by applications in binary or analog formats. The commands can be sent from a human machine interface (HMI) workstation to field instruments connected to a particular RTU to provide a status reading or to perform a certain action remotely. The command originating from the HMI station can typically be delivered to its target as quickly as possible, such as within seconds or sub-seconds. If a command cannot be delivered or acted upon, the SCADA system can report that failure to the operator.

Master stations, HMIs, and remote terminal units (RTUs) can use a communication medium that facilitates signaling between these terminals, such as by using a path between a master station, HMIs, RTUs, and programmable logic controllers (PLCs). The communication medium can be part of an overall communications subsystem that performs the transmitting and receiving of digital information for the entire SCADA network. The communication medium can use media such as fiber optics, copper cabling, wireless, and very small aperture terminal (VSAT) communications.

In some instances, the remote RTU can be configured with a system buffer capable of storing field information for a configurable period of time (for example, seven days) in the course of transmission from one point to another. The buffer can be used to compensate for a difference in the flow of data, or a time of occurrence of events, when transmitting data from one device to another. If a flow of data is compromised, the data may be used maliciously to determine a type of the facility (for example, an oil, gas, or water well). Additionally, the compromised data may be used to generate trends or patterns, which can expose intelligent and sensitive information as to a well's ascending or descending production capacity. Further, the frequency between data transmissions can indicate an "importance" of the facility to an organization.

Before an RTU is deployed into the field, the RTU is typically brought in from the warehouse into the plant's central control room (CCR) configuration lab. In the CCR configuration lab, a process control engineer can manually assign configuration parameters for the RTU. The configuration parameters can include parameters that define, for example, an RTU name, an Internet protocol (IP) address, Control System address and RTU field instruments' ports and address assignments. After the RTU has been configured, the RTU can then be transported to a designated installation site which can be remote (for example, miles away). At the designated installation site, field instrumentation engineers can install and verify cable termination panels, connect the RTU to field devices, and power on the RTU for initial SCADA communication testing.

In some cases, after deployment has occurred, the newly-installed RTU may not function properly using the pre-specified parameters as set forth, for example, by the SCADA engineering design document. Improper functioning may be attributed to faults in instrumentation, such as faults in connectors, field devices (such as sensors), transmitters, cable termination, or RTU power supplies. To fix the improperly functioning RTU, field instrumentation engineers can apply required fixes to bring the RTU back into normal operations. The required fixes can be accomplished, for example, after inspecting the field wiring for errors, and then replacing faulty instruments and adjusting power supply levels to the RTU.

In other cases, the newly-installed RTU may not function properly because of configuration issues. For example, the configuration issues may include misconfiguration errors that can only be fixed by applying a new modified configuration file. However, the Control System Engineer (CSE) may no longer be on-site or be equipped with the right equipment, such as a laptop, configuration software, and configuration hardware (including cables and connectors). When the CSE engineer is no longer on-site or adequately equipped, fixing the configuration issues using conventional techniques would require the RTU to be returned to the CCR for re-configuration. This type of scenario may be impractical, for example, during a mass SCADA deployment project that involves the installation of tens or hundreds of RTUs in geographically dispersed locations. Location-related challenges can be further complicated by other geographic obstacles desert or deep sea areas. In this case, the time and effort that are consumed by fixing the configuration issues can cause project deployment delays and eventual production loss.

To prevent such problems associated with re-configuring remote RTUs, a system and a method can be provided that enable an automated RTU configuration to be performed remotely from a centralized system in the SCADA network that can be in the main CCR, or any other building or plant premises. The system and method can be augmented by physical security controls such as motion detection, radio frequency identification (RFID), and personal identification number (PIN) code authorization processes. Further, an engineer can easily apply a modified configuration to the RTU if it is determined that an existing configuration is invalid for one or more reasons. The new RTU can be considered to be "raw," meaning that the new RTU lacks any initial configuration to enable a networked based communication back with the control room. As such, a method is provided that includes compensating controls and instrumentation that allows for communication.

In some implementations, a system that can support remote and automated RTU configuration assignment processes can be provided to facilitate interconnecting a new RTU to the SCADA network. The new RTU can communicate initially with a low-level communication protocol using a tri-frequency encoding scheme with an initial data communication relay (IDCR) apparatus. The initial low-level communication signal can include a superimposed frequency on the same network cable. The superimposed frequency may be accessible only by the IDCR for the purpose of conveying basic configuration parameters, such as a medium access control (MAC) address, an RTU name, or a configuration request. On the RTU's behalf, the IDCR relay apparatus can issue a request to convey the configuration parameters to a dynamic RTU configuration assignment server (DRCAS). The DRCAS can be responsible for assigning and maintaining RTU configuration files within the SCADA network after authenticating the configuration request with existing Network Access Control (NAC) or site occupancy sensors (for example, radio frequency identification (RFID) and motion sensors) or both. Upon successful receipt of the configuration request from the IDCR and valid authentication from NAC, the DRCAS can use the IDCR to assign the RTU a high-level communication address which will be required for a higher throughput communication. Once the RTU is configured with a high-level communication address, a full communication route is established between the RTU and the DRCAS, enabling an automatic configuration file download.

FIG. 1 is a block diagram depicting an example of a communication architecture 100 including a dynamic RTU configuration assignment server (DRCAS), according to some implementations of the present disclosure. For example, the communication architecture 100 can be used to handle initial configuration of a remote RTU. Features of the communication architecture 100 that may be provided by some conventional systems are contained in dashed lines 102. Features of the communication architecture 100 that are not provided by conventional systems are included in techniques described in the present disclosure.

The communication architecture 100 includes field instruments 104 that can communicate with an IDCR apparatus 106. The communication can include low-level communication 108 and superimposed dual frequency encoding 110.

The IDCR apparatus 106 can communicate with components in a SCADA network 112, including engineering stations 114 and human machine interface (HMI) stations 116. The IDCR apparatus 106 can also use a high-level communication conduit 118 to communicate with a DRCAS 120

Figure 2:
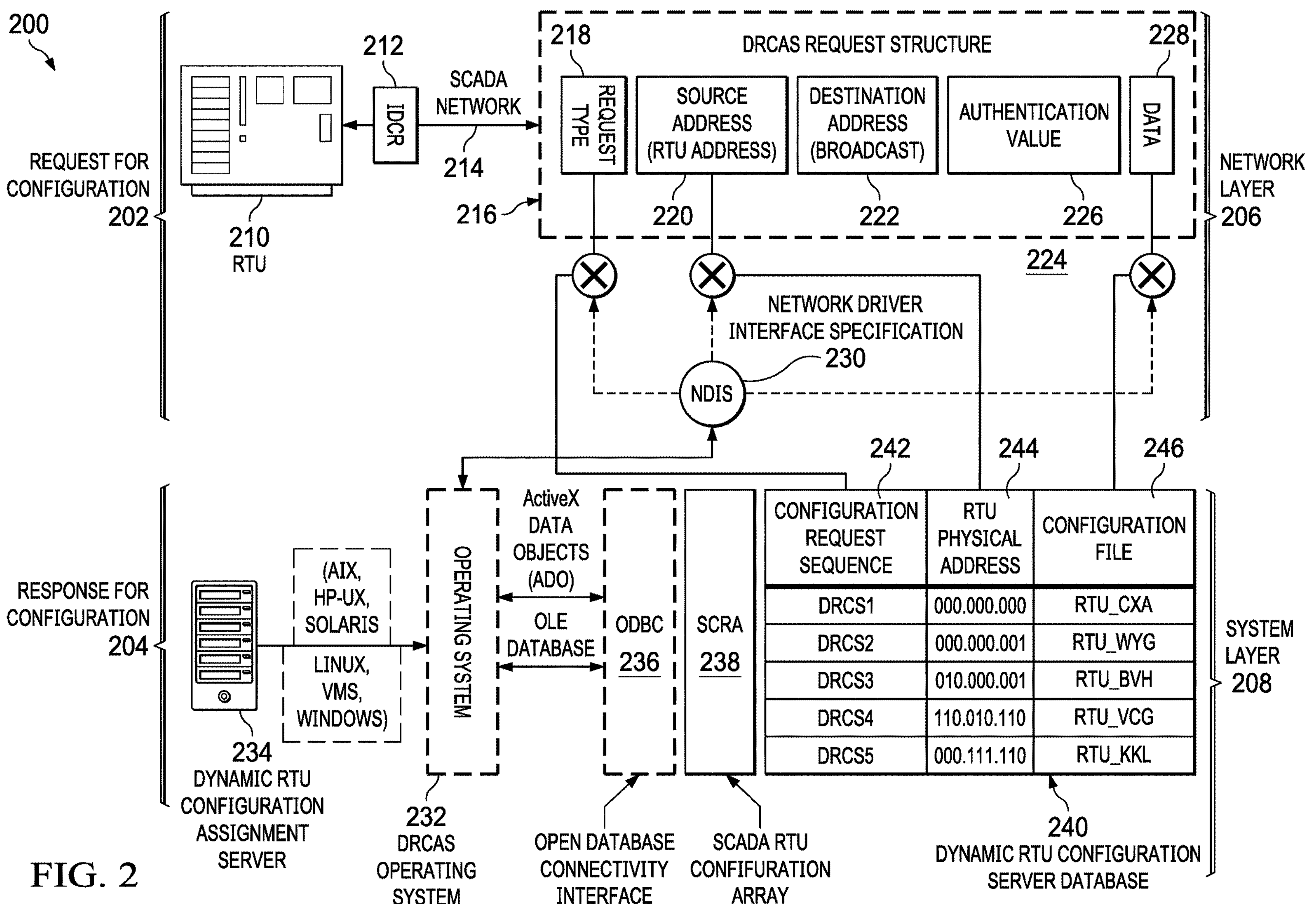
FIG. 2 is a block diagram of a DRCAS architecture handling a configuration request and a configuration response, according to some implementations of the present disclosure.

FIG. 2 is a block diagram of a DRCAS architecture 200 handling a configuration request 202 and a configuration response 204, according to some implementations of the present disclosure. The configuration request 202 and the configuration response 204 can occur at a network layer 206 and a system layer 208, respectively.

In the network layer 206, an RTU 210 can use an IDCR apparatus 212 (for example, the IDCR apparatus 106) to communicate with a SCADA network 214 (for example, the SCADA network 112). A configuration request 216 can include a request type 218 (for example, new or renew), a source (or RTU) address 220, a destination address 222, an authentication value 226, and a data field 228. The authentication value 226 can include a yield value that is output from all authentication and authorization signals (for example, from NAC or on-site RFID or motion sensors). The data field 228 can contain the configuration payload)

An RTU configuration file can include the RTU's name, address and associated field instrumentation data that are read into the RTU's internal arrays. During configuration, the configuration file can be read, the information can be unpacked and extracted, and contained values can be scaled. The configuration data can be packed into a buffer allocated to each field device, and accordingly written to the RTU. The DRCAS server can query each RTU for a set of buffers that can be used to store field values for field data manipulation, calculation, and the configuration of logs entries, systems alerts, and notifications.

As part of this communication scheme, the RTU 210 can initiate a configuration request which is structured into five fields of information; Request Type (new or renew), Source Address, Destination Address, Authentication Value (for example, holding the yield value outputted from all authentication and authorization signals), and the data field (which would carry the configuration payload). The configuration request can be received by a network driver interface specification (NDIS) 230. The NDIS 230 can facilitate interprotocol communication on the DRCAS server, including providing simultaneous support for different protocols, such as IP and Modbus. Using an interface of a DRCAS operating system 232 of a DRCAS 234, the NDIS 230 can forward configuration requests. Forwarding can use an open data base connectivity (ODBC) 236 that provides direct access to a SCADA RTU configuration array (SRCA) 238. The SRCA 238 can control access to a dynamic RTU configuration assignment server database 240. In some implementations, the dynamic RTU configuration assignment server database 240 can include three main fields; a configuration request sequence 242, an RTU physical address 244, and an associated RTU configuration file 246.

The present disclosure describes techniques that can be used to provide embedded RTU automated configuration assignment capabilities within a secure SCADA network. For example, integrated security components within RTUs in the SCADA network can include Internet protocol (IP) video servers and recorders, motion detectors, occupancy sensors, radio frequency identification (RFID) and personal identification number (PIN) identification, a network access controller (NAC), and a network management system (NMS). Systems within the SCADA network can support the receipt and use of security parameters that are input from the field. Motion detection and occupancy sensing instrumentation connected to the RTU and IP video equipment can have infra-red (IR) night vision capabilities, RFID identification, and PIN identification.

In some implementations, the DRCAS server can be equipped with industrial protocols in communication with the NAC and all RTUs in the field through the IDCR apparatus 106. Additionally, the DRCAS can support a custom communication protocol to facilitate dynamic assignment of RTU configuration. As part of this communication, the RTU can send an initial "request for configuration (RC)" request to the IDCR relay via low-level communication signaling. This is because the RTU is initially not configured (in "raw" format) to perform any type of communication on a higher level, thus the RTU is unable to reach the DRCAS or any other node on the network with the exception of the IDCR. The un-configured RTU can, however, process an initial communication request including the request for configuration, RTU name, and physical address. The initial communication process can use frequency signals shared between the RTU and IDCR that is superimposed on the connecting medium (cable) between the RTU and the rest of the SCADA network. A tri-frequency encoding scheme can be used. For example, the detection of 600 Hz, 900 Hz, and 1250 Hz frequencies separated by a time delimiter can indicates the character "1." The detection of 720 Hz, 1024 Hz, and 1450 Hz frequencies separated by a time delimiter can indicate the character "e." Therefore, any encoding sequence can be developed to represent the entire values needed to define the three (3) required fields as part of the initial low-level communication between the RTU and the IDCR apparatus. In RTUs connected by fiber optics, the initial low-level communication can be encoded using superimposed light pulsations using a different wave length on the same fiber optic cable.

In some implementations, as part of the low-level tri-frequency encoded communication, the RTU can send its "intent" to obtain a configuration file from the IDCR. In turn, the RTU request can be converted into a higher-level SCADA communication and delivered to the DRCAS server. Having a central reservoir for both RTU configuration and an industrial control systems (ICS) pool of SCADA addresses and RTU system configuration files, the DRCAS can return the IDCR request with an initial SCADA address assignment coupled with the DRCAS SCADA address to the RTU.

In some implementations, the RTU can communicate directly with the DRCAS server to receive the full RTU configuration. The RTU can then generate the required SCADA database update to include the new RTU as part of the SCADA communication process. The subject changes can be applied to SCADA servers A and B, for example. Upon successful configuration, an acknowledgement notification and an alarm can be sent back to the SCADA HMI to confirm a valid configuration assignment.

In some implementations, an initial communication request between the RTU and the IDCR can include three fields: a 256-bit RTU name (32 characters), a 48-bit medium access control (MAC) address, and a 32-bit SCADA communication address. The fields can be encoded using a low-level superimposed frequency modulation by assigning a particular frequency combination to represent an 8-bit character. Additionally, the IDCR can convey authentication and authorization signals from RFID, motion detection, and PIN components back to the NAC.

In some implementations, the DRCAS server can validate the request by inspecting and verifying that the MAC address is among authorized RTUs (for example, using configuration whitelisting). A list of authorized RTUs can be managed on the DRCAS server by a plant administrator who ensures that only authorized RTUs are allowed to receive a remote configuration file. After the initial MAC address validation, the DRCAS can assign a temporary SCADA communication address to the RTU to be used as part of the "direct" communication between the RTU and DRCAS for receiving the full configuration file.

In some implementations, as part of the higher-level communication between the RTU and DRCAS, the DRCAS server can request additional authentication codes that can be entered by the PIN device and augmented by information from the RFID apparatus. Upon valid authentication, the configuration files can be downloaded to the remote RTU from the appropriate storage location.

In some implementations, the DRCAS can communicate with other systems including, for example, management of change (MOC) systems. The communication can allow the DRCAS to verify change authorizations prior to an issuance of a configuration file. The MOC can document proposed changes in a plant's infrastructure using a priority, authorization, and an approval process. After the issuance of the configuration file, the DRCAS can update the MOC, for example, with a message such as "configuration file downloaded for RTU X."

Figure 3:
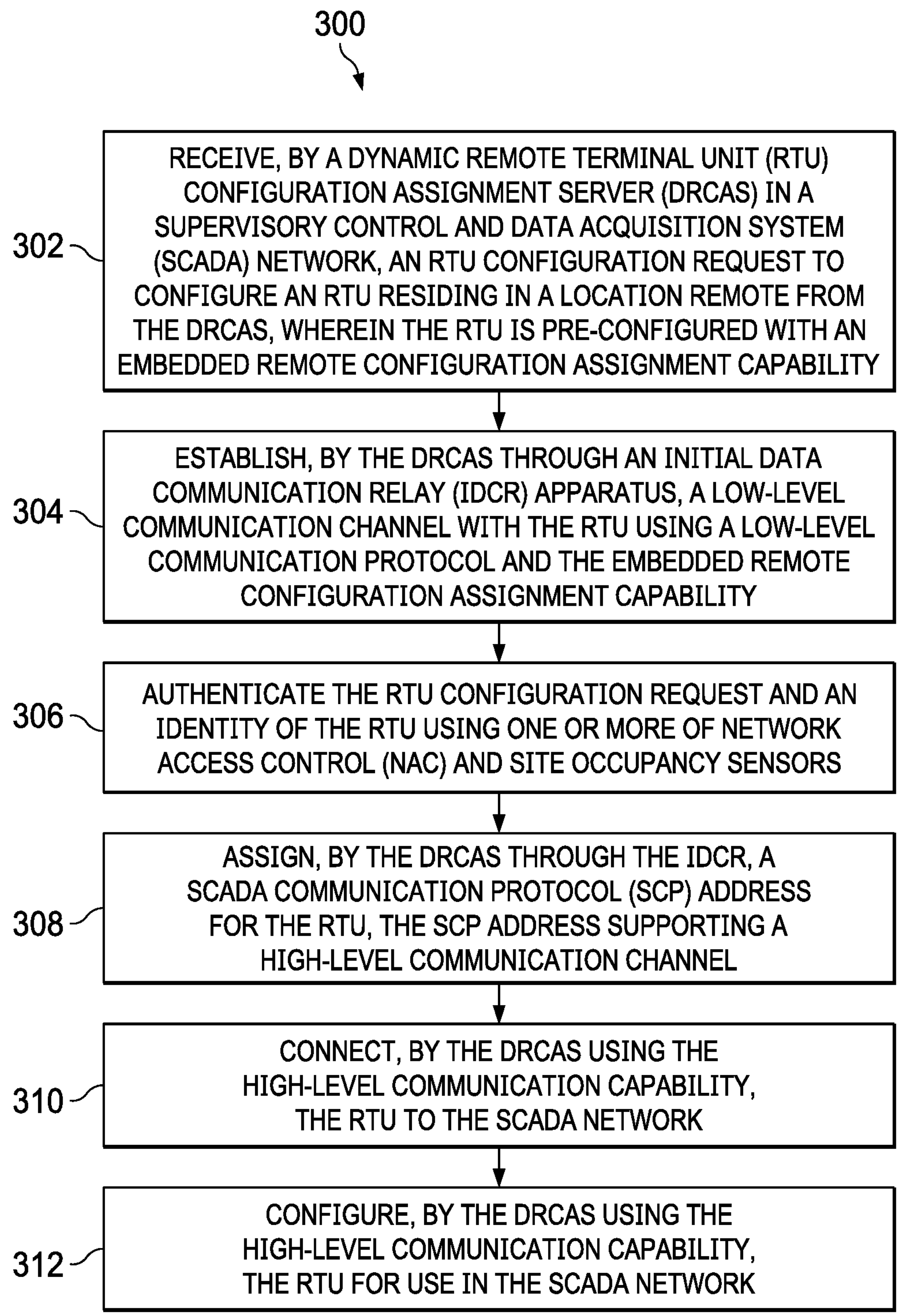
FIG. 3 is a flowchart of an example method for configuring a remote RTU, according to some implementations of the present disclosure.

FIG. 3 is a flowchart of an example method 300 for configuring a remote RTU, according to some implementations of the present disclosure. For clarity of presentation, the description that follows generally describes method 300 in the context of the other figures in this description. However, it will be understood that method 300 can be performed, for example, by any suitable system, environment, software, and hardware, or a combination of systems, environments, software, and hardware, as appropriate. In some implementations, various steps of method 300 can be run in parallel, in combination, in loops, or in any order.

At 302, an RTU configuration request is received by a dynamic remote terminal unit (RTU) configuration assignment server (DRCAS) in a supervisory control and data acquisition system (SCADA) network. The RTU configuration request can be a request to configure an RTU residing in a location remote from the DRCAS. The RTU is pre-configured with an embedded remote configuration assignment capability. From 302, method 300 proceeds to 304.

At 304, a low-level communication channel with the RTU is established by the DRCAS through an initial data communication relay (IDCR) apparatus. The low-level communication channel uses a low-level communication protocol and the embedded remote configuration assignment capability. From 304, method 300 proceeds to 306.

At 306, the RTU configuration request and an identity of the RTU are authenticated using one or more of Network Access Control (NAC) and site occupancy sensors. For example, the RTU identity and the RTU configuration request can be authenticated by the NAC or site occupancy sensors such as RFID and motions sensors. From 306, method 300 proceeds to 308.

At 308, a SCADA Communication Protocol (SCP) address for the RTU is assigned by the DRCAS through the IDCR. The SCP address supports a high-level communication channel. From 308, method 300 proceeds to 310.

At 310, the RTU is connected to the SCADA network by the DRCAS using the high-level communication capability. From 310, method 300 proceeds to 312.

At 312, the RTU is configured for use in the SCADA network. Configuration is done by the DRCAS using the high-level communication capability. After 312, method 300 can stop.

Figure 4:
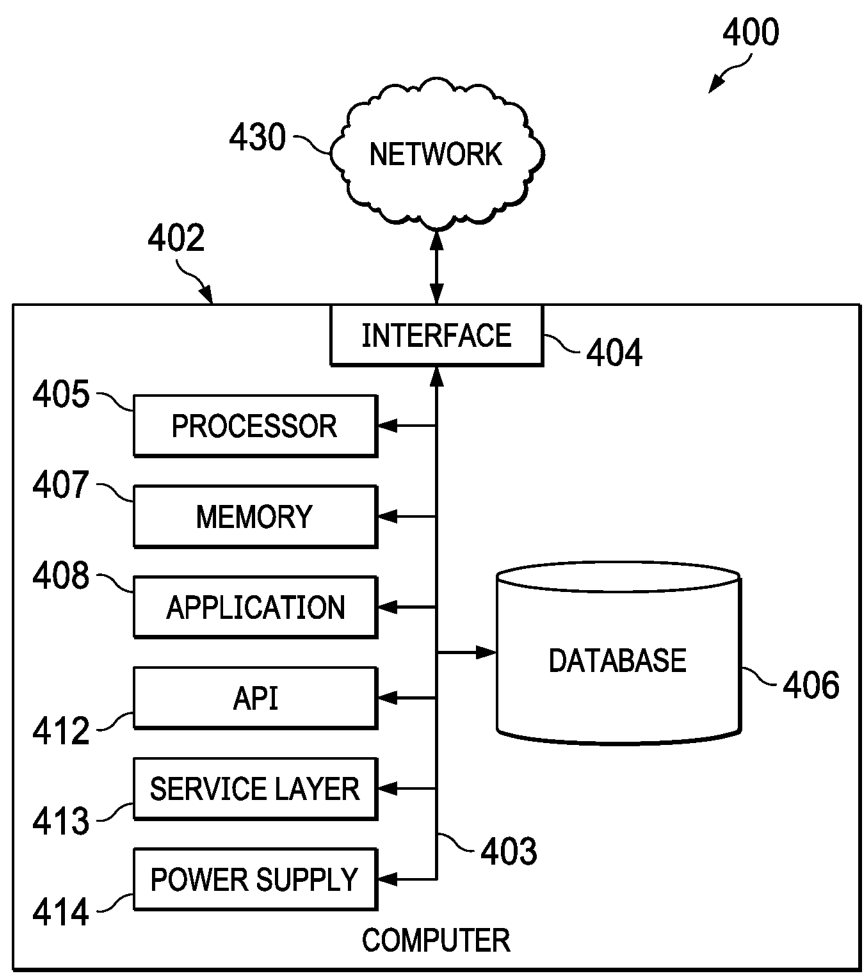
FIG. 4 is a block diagram illustrating an example computer system used to provide computational functionalities associated with described algorithms, methods, functions, processes, flows, and procedures as described in the present disclosure, according to some implementations of the present disclosure.

FIG. 4 is a block diagram of an example computer system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both), over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs.

The service layer 413 can provide software services to the computer 402 and other components (whether illustrated or not) that are communicably coupled to the computer 402. The functionality of the computer 402 can be accessible for all service consumers using this service layer. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 also includes a database 406 that can hold data for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

The application 408 can be an algorithmic software engine providing functionality according to particular needs, desires, or particular implementations of the computer 402 and the described functionality. For example, application 408 can serve as one or more components, modules, or applications. Further, although illustrated as a single application 408, the application 408 can be implemented as multiple applications 408 on the computer 402. In addition, although illustrated as internal to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Described implementations of the subject matter can include one or more features, alone or in combination.

For example, in a first implementation, a computer-implemented method for remotely configuring an RTU includes the following. An RTU configuration request is received by a dynamic RTU configuration assignment server (DRCAS) in a supervisory control and data acquisition system (SCADA) network. The RTU configuration request is a request to configure an RTU residing in a location remote from the DRCAS. The RTU is pre-configured with an embedded remote configuration assignment capability. A low-level communication channel with the RTU is established by the DRCAS through an initial data communication relay (IDCR) apparatus. The RTU configuration request and an identity of the RTU are authenticating using one or more of Network Access Control (NAC) and site occupancy sensors. The low-level communication channel uses a low-level communication protocol and the embedded remote configuration assignment capability. The RTU configuration request and an identity of the RTU are authenticated using one or more of Network Access Control (NAC) and site occupancy sensors. A SCADA Communication Protocol (SCP) address for the RTU is assigned by the DRCAS through the IDCR. The SCP address supports a high-level communication channel. The RTU is connected to the SCADA network by the DRCAS using the high-level communication capability. The RTU is configured for use in the SCADA network. Configuration is done by the DRCAS using the high-level communication capability.

The foregoing and other described implementations can each, optionally, include one or more of the following features:

A first feature, combinable with any of the following features, where the low-level communication protocol uses a tri-frequency encoding scheme.

A second feature, combinable with any of the previous or following features, where the low-level communication protocol uses a superimposed tri-frequency encoding frequency on the same network cable.

A third feature, combinable with any of the previous or following features, where the superimposed frequency is accessible only by the IDCR for conveying basic configuration parameters including a media access control (MAC) address, an RTU name, and the RTU configuration request.

A fourth feature, combinable with any of the previous or following features, where configuring the RTU includes providing an RTU configuration file to the RTU for downloading by the RTU after authenticating the configuration request with Network Access Control (NAC) or site occupancy sensors (for example, radio frequency identification (RFID) and motion sensors) or both.

A fifth feature, combinable with any of the previous or following features, where the configuration request is received from a central control room (CCR) at a plant in the SCADA network.

A sixth feature, combinable with any of the previous or following features, where RTUs in the SCADA network include pressure transmitters, flow meter, and temperature sensors.

In a second implementation, a non-transitory, computer-readable medium storing one or more instructions executable by a computer system to perform operations including the following. An RTU configuration request is received by a DRCAS in a SCADA network. The RTU configuration request is a request to configure an RTU residing in a location remote from the DRCAS. The RTU is pre-configured with an embedded remote configuration assignment capability. A low-level communication channel with the RTU is established by the DRCAS through an IDCR apparatus. The low-level communication channel uses a low-level communication protocol and the embedded remote configuration assignment capability. The RTU configuration request and an identity of the RTU are authenticated using one or more of Network Access Control (NAC) and site occupancy sensors. An SCP address for the RTU is assigned by the DRCAS through the IDCR. The SCP address supports a high-level communication channel. The RTU is connected to the SCADA network by the DRCAS using the high-level communication capability. The RTU is configured for use in the SCADA network. Configuration is done by the DRCAS using the high-level communication capability.

The foregoing and other described implementations can each, optionally, include one or more of the following features:

A first feature, combinable with any of the following features, where the low-level communication protocol uses a tri-frequency encoding scheme.

A second feature, combinable with any of the previous or following features, where the low-level communication protocol uses a superimposed frequency on the same network cable.

A third feature, combinable with any of the previous or following features, where the superimposed frequency is accessible only by the IDCR for conveying basic configuration parameters including a media access control (MAC) address, an RTU name, and the RTU configuration request.

A fourth feature, combinable with any of the previous or following features, where configuring the RTU includes providing an RTU configuration file to the RTU by the DRCAS.

A fifth feature, combinable with any of the previous or following features, where the configuration request is received from a central control room (CCR) at a plant in the SCADA network.

A sixth feature, combinable with any of the previous or following features, where RTUs in the SCADA network include pressure transmitters, flow meter, and temperature sensors.

In a third implementation, a computer-implemented system, comprising one or more processors and a non-transitory computer-readable storage medium coupled to the one or more processors and storing programming instructions for execution by the one or more processors, the programming instructions instructing the one or more processors to perform operations including the following. An RTU configuration request is received by a DRCAS in a SCADA network. The RTU configuration request is a request to configure an RTU residing in a location remote from the DRCAS. The RTU is pre-configured with an embedded remote configuration assignment capability. A low-level communication channel with the RTU is established by the IDCR apparatus. The low-level communication channel uses a low-level communication protocol and the embedded remote configuration assignment capability. The RTU configuration request and an identity of the RTU are authenticated using one or more of Network Access Control (NAC) and site occupancy sensors. An SCP address for the RTU is assigned by the DRCAS through the IDCR. The SCP address supports a high-level communication channel. The RTU is connected to the SCADA network by the DRCAS using the high-level communication capability. The RTU is configured for use in the SCADA network. Configuration is done by the DRCAS using a direct high-level communication capability.

The foregoing and other described implementations can each, optionally, include one or more of the following features:

A first feature, combinable with any of the following features, where the low-level communication protocol uses a tri-frequency encoding scheme.

A second feature, combinable with any of the previous or following features, where the low-level communication protocol uses a superimposed tri-frequency encoded frequency on the same network cable.

A third feature, combinable with any of the previous or following features, where the superimposed frequency is accessible only by the IDCR for conveying basic "initial" configuration parameters including a media access control (MAC) address, an RTU name, and the RTU configuration request.

A fourth feature, combinable with any of the previous or following features, where configuring the RTU includes providing an RTU configuration file to the RTU by the DRCAS.

A fifth feature, combinable with any of the previous or following features, where the configuration request is received from a central control room (CCR) at a plant in the SCADA network.

A sixth feature, combinable with any of the previous or following features, where RTUs in the SCADA network include pressure transmitters, flow meter, and temperature sensors.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLURAY.

The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:

receiving, by a dynamic remote terminal unit (RTU) configuration assignment server (DRCAS) in a supervisory control and data acquisition system (SCADA) network, an RTU configuration request to configure an RTU in a "raw" condition residing a location remote from the DRCAS, wherein the RTU is pre-configured with an embedded remote configuration assignment capability;

establishing, by the DRCAS through an initial data communication relay (IDCR) apparatus, a low-level communication channel with the RTU using a low-level communication protocol and the embedded remote configuration assignment capability, wherein the low-level communication protocol uses a tri-frequency encoding scheme;

authenticating the RTU configuration request and an identity of the RTU using one or more of Network Access Control (NAC) and site occupancy sensors;

assigning, by the DRCAS through the IDCR, a SCADA Communication Protocol (SCP) address for the RTU, the SCP address supporting a high-level communication channel;

connecting, by the DRCAS using the high-level communication capability, the RTU to the SCADA network; and configuring, by the DRCAS using the high-level communication capability, the RTU for use in the SCADA network.

2. The computer-implemented method of claim 1, wherein the low-level communication protocol uses a superimposed frequency on the same network cable.

3. The computer-implemented method of claim 2, wherein superimposed frequency is accessible only by the IDCR for conveying basic configuration parameters including a media access control (MAC) address, an RTU name, and the RTU configuration request.

4. The computer-implemented method of claim 1, wherein configuring the RTU includes providing an RTU configuration file to the RTU from the DRCAS.

5. The computer-implemented method of claim 1, wherein the configuration request is received from a central control room (CCR) at a plant in the SCADA network.

6. The computer-implemented method of claim 1, wherein RTUs in the SCADA network include pressure transmitters, flow meter, and temperature sensors.

7. A non-transitory computer-readable medium storing one or more instructions executable by a computer system to perform operations comprising:

receiving, by a dynamic remote terminal unit (RTU) configuration assignment server (DRCAS) in a supervisory control and data acquisition system (SCADA) network, an RTU configuration request to configure an RTU in a "raw" condition residing a location remote from the DRCAS, wherein the RTU is pre-configured with an embedded remote configuration assignment capability;

establishing, by the DRCAS through an initial data communication relay (IDCR) apparatus, a low-level communication channel with the RTU using a low-level communication protocol and the embedded remote configuration assignment capability, wherein the low-level communication protocol uses a tri-frequency encoding scheme;

authenticating the RTU configuration request and an identity of the RTU using one or more of Network Access Control (NAC) and site occupancy sensors;

assigning, by the DRCAS through the IDCR, a SCADA Communication Protocol (SCP) address for the RTU, the SCP address supporting a high-level communication channel;

connecting, by the DRCAS using the high-level communication capability, the RTU to the SCADA network; and configuring, by the DRCAS using the high-level communication capability, the RTU for use in the SCADA network.

8. The non-transitory computer-readable medium of claim 7, wherein the low-level communication protocol uses a superimposed frequency on the same network cable.

9. The non-transitory computer-readable medium of claim 8, wherein superimposed frequency is accessible only by the IDCR for conveying basic configuration parameters including a media access control (MAC) address, an RTU name, and the RTU configuration request.

10. The non-transitory computer-readable medium of claim 7, wherein configuring the RTU includes providing an RTU configuration file to the RTU for downloading by the RTU.

11. The non-transitory computer-readable medium of claim 7, wherein the configuration request is received from a central control room (CCR) at a plant in the SCADA network.

12. The non-transitory computer-readable medium of claim 7, wherein RTUs in the SCADA network include pressure transmitters, flow meter, and temperature sensors.

13. A computer-implemented system, comprising:

one or more processors; and a non-transitory computer-readable storage medium coupled to the one or more processors and storing programming instructions for execution by the one or more processors, the programming instructions instructing the one or more processors to perform operations comprising:

receiving, by a dynamic remote terminal unit (RTU) configuration assignment server (DRCAS) in a supervisory control and data acquisition system (SCADA) network, an RTU configuration request to configure an RTU in a "raw" condition residing a location remote from the DRCAS, wherein the RTU is pre-configured with an embedded remote configuration assignment capability;

establishing, by the DRCAS through an initial data communication relay (IDCR) apparatus, a low-level communication channel with the RTU using a low-level communication protocol and the embedded remote configuration assignment capability, wherein the low-level communication protocol uses a tri-frequency encoding scheme;

authenticating the RTU configuration request and an identity of the RTU using one or more of Network Access Control (NAC) and site occupancy sensors;

assigning, by the DRCAS through the IDCR, a SCADA Communication Protocol (SCP) address for the RTU, the SCP address supporting a high-level communication channel;

connecting, by the DRCAS using the high-level communication capability, the RTU to the SCADA network; and configuring, by the DRCAS using the high-level communication capability, the RTU for use in the SCADA network.

14. The computer-implemented system of claim 13, wherein the low-level communication protocol uses a superimposed frequency on the same network cable.

15. The computer-implemented system of claim 14, wherein superimposed frequency is accessible only by the IDCR for conveying basic configuration parameters including a media access control (MAC) address, an RTU name, and the RTU configuration request.

16. The computer-implemented system of claim 13, wherein configuring the RTU includes providing an RTU configuration file to the RTU for downloading by the RTU.

17. The computer-implemented system of claim 13, wherein the configuration request is received from a central control room (CCR) at a plant in the SCADA network.

* * * * *